US012340095B2

(12) United States Patent
Thiruvengadam et al.

(10) Patent No.: US 12,340,095 B2
(45) Date of Patent: *Jun. 24, 2025

(54) MANAGEMENT OF ERROR-HANDLING FLOWS IN MEMORY DEVICES USING PROBABILITY DATA STRUCTURE

(71) Applicant: MICRON TECHNOLOGY, INC., Boise, ID (US)

(72) Inventors: Aswin Thiruvengadam, Folsom, CA (US); Vamsi Pavan Rayaprolu, Santa Clara, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

This patent is subject to a terminal disclaimer.

(21) Appl. No.: 18/659,217

(22) Filed: May 9, 2024

(65) Prior Publication Data
US 2024/0289032 A1 Aug. 29, 2024

Related U.S. Application Data

(63) Continuation of application No. 17/943,082, filed on Sep. 12, 2022, now Pat. No. 12,032,833.

(51) Int. Cl.
*G06F 3/06* (2006.01)

(52) U.S. Cl.
CPC .......... *G06F 3/0619* (2013.01); *G06F 3/0655* (2013.01); *G06F 3/0679* (2013.01)

(58) Field of Classification Search
CPC .................. H04L 7/0338; H04L 25/03828
See application file for complete search history.

(56) References Cited

U.S. PATENT DOCUMENTS

2018/0137003 A1 5/2018 Pignatelli et al.
2021/0334206 A1 10/2021 Colgrove et al.

*Primary Examiner* — Yong J Choe
(74) *Attorney, Agent, or Firm* — Lowenstein Sandler LLP

(57) ABSTRACT

Systems and methods are disclosed including a memory device and a processing device operatively coupled to the memory device. The processing device can perform operations including running sample data through each of a set of error-handling operations performed on data residing in a segment of the memory device in an existing order; and determining an optimized order of the set of error-handling operations based on probability data and latency data, wherein the probability data is associated with a result of running the sample data, and wherein the optimized order comprises an adjustment to an order of one or more error-handling operations of the set of error-handling operations in the existing order.

20 Claims, 7 Drawing Sheets

| ERROR-HANDLING DATA TABLE 210 | | | | | |
|---|---|---|---|---|---|
| Sample Data | Current Flow | Step ID | Operation | Pass Count | Fail Count |
| SD1 | F1 | S1 | OP1 | PC1 | FC1 |
| | | S2 | OP2 | PC2 | FC2 |
| | | S3 | OP3 | ⋮ | ⋮ |
| | | S4 | OP4 | ⋮ | ⋮ |
| ⋮ | ⋮ | ⋮ | ⋮ | | |

FIG. 2

| Step ID | Flow ID | Ordered Operations | Step Probability |
|---|---|---|---|
| S1 | F1 | OP1, OP2, OP3, OP4 | P11 |
| S2 | | | P12 |
| S3 | | | P13 |
| S4 | | | P14 |
| ⋮ | ⋮ | ⋮ | ⋮ |
| S1 | F24 | OP4, OP3, OP2, OP1 | P241 |
| S2 | | | P242 |
| S3 | | | P243 |
| S4 | | | P244 |

ERROR-HANDLING PROBABILITY TABLE 310A

| ERROR-HANDLING PROBABILITY TABLE 310B | | | | |
|---|---|---|---|---|
| Step Probability | Current Option 1 | Current Option 2 | Current Option 3 | Current Option 4 |
| Previous option 1 | P (o1=1\|o1=0) | P (o2=1\|o1=0) | P (o3=1\|o1=0) | P (o4=1\|o1=0) |
| Previous option 2 | P (o1=1\|o2=0) | P (o2=1\|o2=0) | P (o3=1\|o2=0) | P (o4=1\|o2=0) |
| Previous option 3 | P (o1=1\|o3=0) | P (o2=1\|o3=0) | P (o3=1\|o3=0) | P (o4=1\|o3=0) |
| Previous option 4 | P (o1=1\|o4=0) | P (o2=1\|o4=0) | P (o3=1\|o4=0) | P (o4=1\|o4=0) |

FIG. 3B

MANAGEMENT OF ERROR-HANDLING FLOWS IN MEMORY DEVICES USING PROBABILITY DATA STRUCTURE

RELATED APPLICATIONS

This application is a continuation application of co-pending U.S. patent application Ser. No. 17/943,082, filed Sep. 12, 2022, which is incorporated herein by reference.

TECHNICAL FIELD

Embodiments of the disclosure relate generally to memory sub-systems, and more specifically, relate to management of error-handling flows in memory devices using probability data structure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

FIGS. 2, 3A, 3B, and 4 illustrate example error-handling flow data in accordance with aspects of the present disclosure.

DETAILED DESCRIPTION

Figure 1:
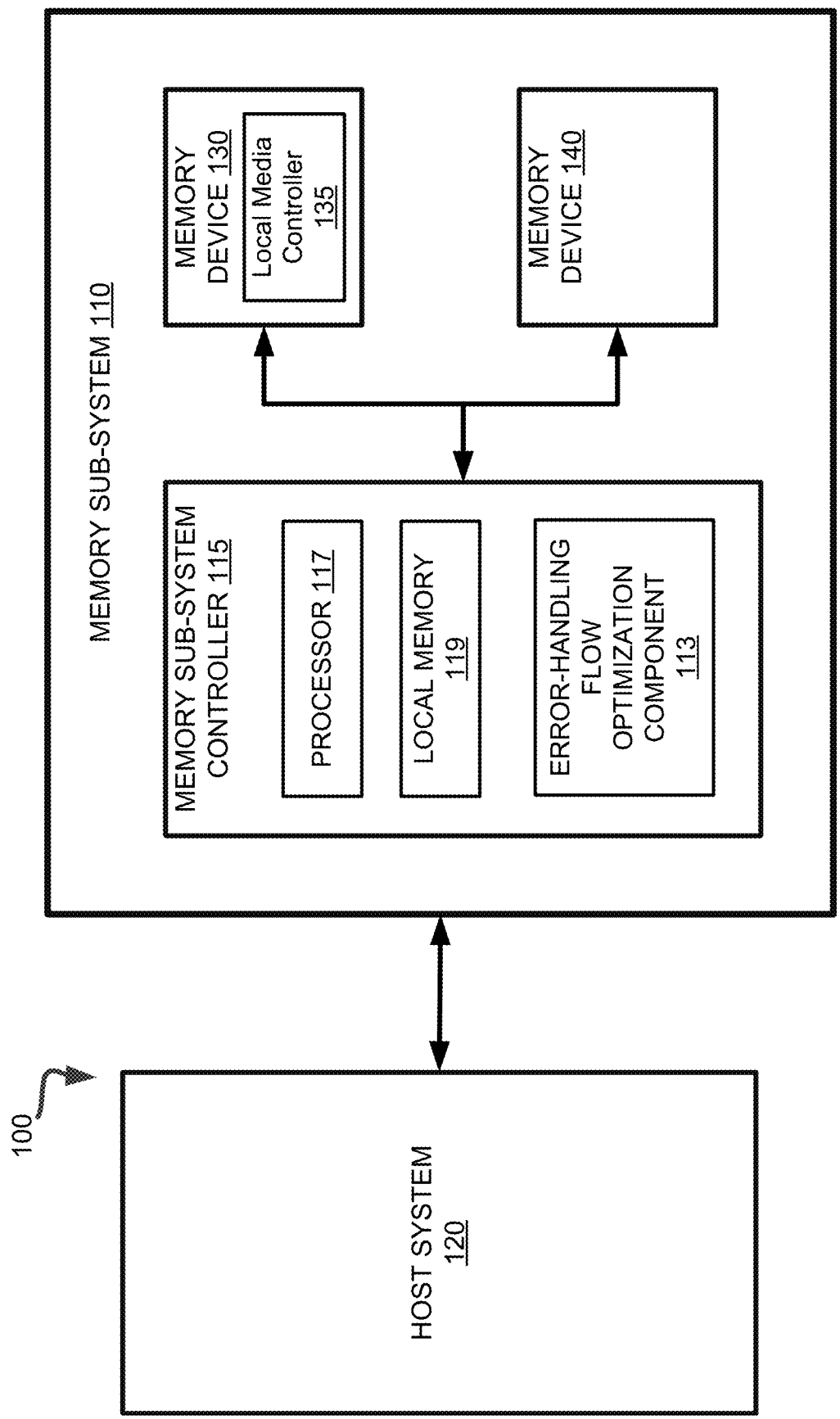
FIG. 1 illustrates an example computing system that includes a memory sub-system in accordance with some embodiments of the present disclosure.

Aspects of the present disclosure are directed to managing error-handling flows in memory devices. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. One example of a non-volatile memory device is a negative-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values.

Various data operations can be performed by the memory sub-system. The data operations can be host-initiated operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error-handling data (e.g., error correction code (ECC) codeword parity data), data version (e.g. used to distinguish age of data written), valid bitmap (which LBAs or logical transfer units contain valid data), etc.

A memory device includes multiple memory cells capable of storing, depending on the memory cell type, one or more bits of information. A memory cell can be programmed (written to) by applying a certain voltage to the memory cell, which results in an electric charge being held by the memory cell, which is called the "threshold voltage" and denoted as Vt. A memory device can have distributions that are narrow compared with the working range of control voltages tolerated by the cells of the device. Accordingly, multiple distributions (with "valleys" between distributions) can be fit into the working voltage window allowing storing and reliably detecting multiple bits per cell such as $2^3=8$ distributions (7 valleys) for TLC, $2^2=4$ distributions (3 valleys) for MLC etc. The distributions are interspersed with voltage intervals ("valley margins") between distributions where none (or very few) of the memory cells of the device have their threshold voltages. Therefore, such valley margins can be used to separate various charge states—the logical state of the cell can be determined by detecting, during a read operation, by applying read voltages corresponding to each valley. This effectively allows a single memory cell to store multiple bits of information: a memory cell operated with $2^N$ distributions (which are also called levels) is capable of storing N bits of information. During the read operation, $2^N-1$ read voltages are applied to distinguish $2^N$ distributions. Specifically, the read operation can be performed by comparing the measured threshold voltage $V_T$ exhibited by the memory cell to one or more reference voltage levels corresponding to known valleys (e.g., centers of the valleys) of the memory device.

Due to the phenomenon known as slow charge loss (SCL), the threshold voltage $V_T$ of a memory cell can change with time as the electric charge of the cell is diminishing, the process sometimes referred to as "temporal voltage shift" (TVS). Since typical cells store negatively charged particles (electrons), the loss of electrons causes the voltage thresholds to shift along the voltage axis towards lower voltage thresholds $V_T$. The threshold voltages can change rapidly at first (immediately after the memory cell is programmed) while slowing down at larger times in an approximately log-linear or power-law fashion ($\Delta V_T(t) = -C*t^b$) with respect to the time t elapsed since the cell programming event. TVS can be mitigated by keeping track of the time elapsed since the programming event as well as of the environmental conditions of a particular memory partition (block, plane, etc.) such as temperature and associating a voltage offset $\Delta V_T$ per valley to be used during read operations, where the standard "base read level" threshold voltage $V_T$ (displayed by the cell immediately after programing) is modified by the voltage offset: $V_T \rightarrow V_T + \Delta V_T$ where $\Delta VT$ is negative due to charge loss.

"Read error" refers to a memory sub-system's failure to validate one or more data items that have been retrieved from a memory device in response to a read command. Read errors can be associated with host-initiated read operations or system-initiated scanning operations and can occur due to, for example, the measured threshold voltage $V_T$ exhibited by the memory cell mismatching the read voltage levels due to TVS, the requested data being subjected to noise or interference, etc. In a read error, the number of bit errors in the read data is greater than what the underlying ECC can correct and this results in an ECC failure. In response to a read error, the memory sub-system can perform an error-handling flow in an attempt to recover the data. The error-handling flow can include one or more error-handling operations performed with respect to the data items that have been retrieved from the memory device. An error handling operation, for example, can include one or more read retries using different parameters, such as a change in read voltage, as compared to the initial read operation performed on the memory cell. The error-handling operation can also include "deep error handling techniques," such as forward error correction (FEC) with various versions of reliability information, hybrid automatic repeat request (HARQ), etc.

In conventional systems, the memory sub-system controller uses a default (e.g., static) error-handling flow, in which the order of the error-handling operations performed during an error-handling flow remains the same for all blocks of the memory device over the entire life of the memory sub-system. For example, the order of the error-handling operations may be initially set based on characterization data collected during product development, but remains static even as the actual operating conditions changes. Certain changes in operating conditions may result in inefficiencies in the predefined order of error-handling operations, such as increased latency. The inefficiencies cannot be addressed, however, due to the static order of the error handling operations. In some implementations, in response to sudden systematic changes to the memory sub-system, such as a sudden change in operating temperature (e.g., operating temperature rises 20° C. over a period of a few seconds), the memory sub-system controller can adjust the order of the error-handling operations performed during an error-handling flow by performing the last successful error handling-operation of an error-handling flow as the first error-handling operation in response to a new read error. These error-handling techniques, however, do not consider the system latency and throughput under varied workload stress conditions. In some implementations, the memory sub-system controller can collect data of an aggregate count of the error-handling operation that has been successfully performed with respect to the data items that have been retrieved from the memory device. However, the error-handling data collection only illustrates how effective the current error-handling flow is, but does not offer an option for optimizing the error-handling flow.

Aspects of the present disclosure improve the efficiency of error-handling operations by implementing a memory sub-system controller capable of optimizing the order of error-handling operations in error-handling flows in memory devices. The optimization can use a data structure regarding probability data of error recovery for each error-handling operation, The data structure includes information representing different options for the next step to perform in an error-handling flow. The optimization can use the probability data along with the latency data to calculate an order of error-handling flow that has least latency related cost. The data structure can be generated offline as a pre-characterization for various workloads, can be generated in real-time as a background task representing the whole drive, or can be dynamically generated or adjusted according to a specific workload associated with an error.

In some implementations, a memory sub-system controller may generate the probability data by selecting sample data associated with a memory device (or a subset of the memory device) and running the selected sample data through each error-handling operation in the current error-handling flow, and the current error-handling flow may be associated with a specific workload using the memory device. The memory sub-system controller may then obtain a pass count and a fail count of each error-handling operation as the sample data going through the error-handling flow. The memory sub-system controller may use the pass counts and fail counts to calculate the probability data of each error-handling operation. In some examples, a machining learning model (e.g., a Markov process) may be used by collecting data of the pass counts and fail counts to calculate the probability data and generate the data structure. With the probability data of each error-handling operation, the memory sub-system controller may use latency data with the probability data to calculate a sum cost of performing the error-handling operation with consideration of all previously-performed error-handling operations in the error-handling flow. The memory sub-system controller may select the error-handling operation that corresponds to the smallest sum cost as a next operation to perform. The memory sub-system controller may use the selected error-handling operation to update the error-handling flow, i.e., the order of the set of the error-handling operations. In some implementations, the memory sub-system controller may repeat the process from selecting sample data to selecting the error-handling operation to update the error-handling flow until all steps in the error-handling flow have been updated. In some implementations, the memory sub-system controller may continuously repeat the process from selecting sample data to selecting the error-handling operation to update the error-handling flow.

Advantages of the present disclosure include an improved performance of the memory sub-system by having probability data of error recovery for each error-handling operation ready for use to determine an optimization of error-handling flows performed by the memory sub-system. The optimization decreases the latency of error-handling flows performed by the memory sub-system. This can result in an improvement of performance of the memory sub-system and a decrease in power consumption by the memory sub-system. Furthermore, this can increase the lifespan of the memory sub-system. Although embodiments are described using memory cells of a NAND flash memory, aspects of the present disclosure can be applied to other types of memory sub-systems.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g. 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 can include an error-handling flow optimization component 113 that can be used to implement the error handling strategies in accordance with embodiments of the present disclosure. The error-handling flow optimization component 113 may provide a data structure including probability data of error-handling operations' performance for use in the error-handling flow optimization. In some embodiments, the memory sub-system 110 includes at least a portion of the error-handling flow optimization component 113. For example, the memory sub-system controller 115 can include a processor 117 (processing device) configured to execute instructions stored in local memory 119 for performing the operations described herein. In some embodiments, the error-handling flow optimization component 113 is part of an application, or an operating system. The error-handling flow optimization component 113 can optimize the error-handling operations associated with the memory device 130, as described in more detail herein below.

The error-handling flow optimization component 113 may generate the probability data by selecting sample data associated with a memory device (or a subset of the memory device) and running the selected sample data through each error-handling operation in the current error-handling flow, which may be associated with a specific workload using the memory device. The error-handling flow optimization component 113 may then obtain a pass count and a fail count of each error-handling operations as sample data going through the flow. The error-handling flow optimization component 113 may use the pass counts and fail counts to calculate the probability data of each error-handling operation. With the probability data of each error-handling operation, the error-handling flow optimization component 113 may use latency data with the probability data to calculate a sum cost of performing the error-handling operation with consideration of all previously-performed error-handling operations in the flow. The error-handling flow optimization component 113 may select the error-handling operation that corresponds to the smallest sum cost as the next operation to perform. The error-handling flow optimization component 113 may use the selected the error-handling operation to update the error-handling flow, i.e., the order of the set of the error-handling operations. In some implementations, the error-handling flow optimization component 113 may repeat the process from selecting sample data to selecting the error-handling operation to update the error-handling flow until all steps in the error-handling flow have been updated. In some implementations, the error-handling flow optimization component 113 may continuously repeat the process from selecting sample data to selecting the error-handling operation to update the error-handling flow.

The error-handling flow optimization component 113 may generate, build, contrast, or train a machine-learning model using the error-handling probability data. In some implementations, the error-handling probability data may be associated with a specific memory device that is used by a specific user device performing a specific workload. In some implementations, the error-handling probability data may be associated with a similar population of the memory devices that are used by similar user devices performing similar workloads. With sufficient training data, the machine-learning model can be a global model that is applicable to various population of various memory devices with various workloads. For example, the workload can be read heavy, write heavy, retention centric, disruption centric, etc. The granularity of memory devices can be a die, a whole drive, or multiple drives.

The error-handling flow optimization component 113 may apply the machine-learning model to an error-handling flow to obtain the probability data structure, which can be used to obtain a reordered rank of the error-handling operations in the error-handling flow step by step, i.e., update one error-handling operation at a time. The error-handling flow optimization component 113 may send the reordered rank to the corresponding memory device to perform the error-handling operations in the adjusted order for the error-handling flow, and thus the corresponding memory device can continuously update the error-handling operations.

Figure 3A:
Figure 4:

FIGS. 2-4 schematically illustrates example error-handling flow data 200-400 in accordance with aspects of the present disclosure. The error-handling flow data 200-400 may be saved in a persistent storage that is capable of storing the error-handling flow data 200-400 (e.g., tables) as well as data structures to tag, organize, and index the error-handling flow data 200-400 (e.g., tables). Such persistent storage may be hosted by one or more storage devices, such as main memory, magnetic or optical storage based disks, tapes or hard drives, NAS, SAN, and so forth. In some implementations, the error-handling flow data 200-400 may be saved in a network-attached file server, while in other embodiments, the error-handling flow data 200-400 may be saved in other type of persistent storage such as an object-oriented database, a relational database, and so forth, that may be hosted by a server machine or one or more different machines coupled to the via a network. In some embodiments, error-handling flow optimization component 113 can maintain the error-handling flow data 200-400. In some embodiments, the error-handling flow data 200-400 can be stored in memory of the memory sub-system (e.g., at memory device 130, 140, local memory 119, etc.) and can be referenced by error-handling flow optimization component 113 to determine a reordered error-handling flow.

In some implementations, the error-handling flow data 200-400 may be generated as a pre-characterized data structure that would be used throughout the life of the memory device. For example, different workload conditions are used to characterize the data structure for a specific memory device or a group of similar memory devices. In some examples, the data structure may provide the error-handling flow optimization for each workload type.

In some implementations, the error-handling flow data 200-400 may be generated as a background task of a memory device that has been put in use, for example, by a controller of the memory device (e.g., memory sub-system controller 115 or local media controller 135). For example, sample data may be randomly selected through the memory device and used for generating the data structure including probability data, and then the probability data is used together with the latency data to provide the error-handling flow optimization.

In some implementations, the error-handling flow data 200-400 may be generated dynamically and/or updated dynamically by a controller of the memory device (e.g., memory sub-system controller 115 or local media controller 135). For example, a predetermined error-handling flow may be used to start with, and when the predetermined error-handling flow fails at a certain step, the sample data may be selected and used for generating the data structure including probability data, and then the probability data is used together with the latency data to provide the error-handling flow optimization for that step. The process can be then recursive until all steps in the predetermined error-handling flow have been updated to be optimal.

Referring to FIG. 2, sample data is selected and current error-handling flow is used for running the sample data through. In some implementations, the current error-handling flow is associated with current workload, and the sample data is selected from the data that have run through the current error-handling flow. For example, every 1 out of N codewords is sampled from the data that have passed the current error-handling flow as the sample data. In some implementations, the sample data is tested through the first step and then one additional step (e.g., one randomly chosen step) of the current error-handling flow. For example, the current flow includes four steps corresponding to four error-handling operations, the pass counts and the fail counts for the first operation and one operation randomly chosen from the second, third, and fourth operations are recorded as the sample data running through the flow. In some implementations, the sample data is tested through each step of the current error-handling flow. For example, if the current flow includes four steps corresponding to four error-handling operations, the pass counts and the fail counts for each operation are recorded as the sample data running through the flow. The pass/fail counts information is to be used for generating the probability data of error recovery for each operation, as explained in detail with respect to FIGS. 3A and 3B.

Referring to FIG. 3A, step probability is calculated, and can refer to the probability that all previous steps have failed to recover the error until the current step. For example, with the flow F1 including four steps S1, S2, S3, S4, corresponding to the ordered operations OP 1, OP 2, OP 3, OP 4, the step probability P11 of step S1 is the probability of all previous steps before step S1 have failed, which is 0 because no previous steps before step S1 applies; the step probability P12 of step S2 is the probability of all previous steps before step S2 have failed, which is FC1/(PC1+FC1) because one previous step S1 applies; the step probability P13 of step S3 is the probability of all previous steps before step S3 have failed, which is (FC1/(PC1+FC1))×(FC2/(PC2+FC2)) because two previous steps S1 and S2 apply; and the step probability P14 of step S4 can be calculated similarly. As shown in FIG. 3A, for a four-step flow, there can be 4!=24 options for the flow, and for each flow, the step probability for each step can be calculated similarly as described above.

Referring to FIG. 3B, the error-handling probability table 310B may be a simplified version of the error-handling probability table 310A under the assumption that the step probability of each step only depends on the probability of one previous step (e.g., most recently step) has fails. For example, assuming the previous step is the previous option 1, the step probability of step of option 1 is the probability of previous option 1 fails, i.e., P (o1=1| o1=0); the step probability of step of option 2 is the probability of previous option 1 fails, i.e., P (o2=1| o1=0); the step probability of step of option 3 is the probability of previous option 1 fails, i.e., P (o3=1|o1=0); the step probability of step of option 4 is the probability of previous option 1 fails, i.e., P (o4=1|o1=0), as shown in the third row of the error-handling probability table 310B. The rest rows of error-handling probability table 310B can be calculated similarly. The error-handling probability table 310B reduces the entries and can be a Markov process that for the current step, only one previous step is considered.

Although not shown in FIGS. 3A and 3B, the latency data for each operation (including latency of all previous steps in a flow) may be recorded along with the probability data. By using the probability data along with the latency data for each operation, an operation can be selected as the error-handling operation to be performed at the particular step. For example, in some error-handling data, each error-handling flow can be associated with a particular set of error-handling operations to be performed in a particular order (e.g., order of operations). Each error-handling operation can be associated with parameters, such as step ID, operation parameters (such as an indication of workload, or an identification of memory device), step latency, step probability, and sum cost. The step ID may represent an error-handling operation. The operation parameters may include an indication of a specific workload and an identification of a specific memory device or a specific part of a memory device. The step latency may be represented or calculated as a sum of latency including current and previous steps of the error-handling operation. The step probability may represent the likelihood that the data will be successfully recovered for the respective error-handling operation and may be calculated or obtained as shown in FIGS. 3A and 3B. In some implementations, a sum cost may be used for selecting an optimal operation. The sum cost may be represented or calculated as an overall latency indication based on domain knowledge of memory device design as well as workload experience using different mythologies. In one implementation, the sum cost may be calculated as a sum of the aggregated latency of each operation (including all latency of previous operations in the error-handling flow) times the probability of execution of the respective operation (e.g., Cost=Latency 1×Probability 1+Latency 2× Probability 2+ . . . ). As such, the error-handling flow optimization component 113 may use the above information in the error-handling flow data to create a model that effectively represents optimized error-handling steps with latency impacted by workload experiences and memory device variations and achieves a minimum system latency for a given workload on a given memory device.

Referring to FIG. 4, the error-handling operation table 410 illustrates the step-by-step optimization of an existing error-handling flow. For example, using the above described techniques, operation SP1 is selected from the current flow (F1) as an optimal operation, and then is used as the first step of the updated flow (SP1, F2); then similarly, operation SP2 is selected from the current flow (SP1, F2), and then is used as the second step of the updated flow (SP1, SP2, F3); and so on. Eventually, all steps of the existing error-handling flow have been updated to have a flow (SP1, SP2, SP3, . . . , SP(N−1), SN). Although the optimization and update of all steps in an error-handling flow is illustrated here, the optimization and update can be continue indefinitely.

Figure 5:
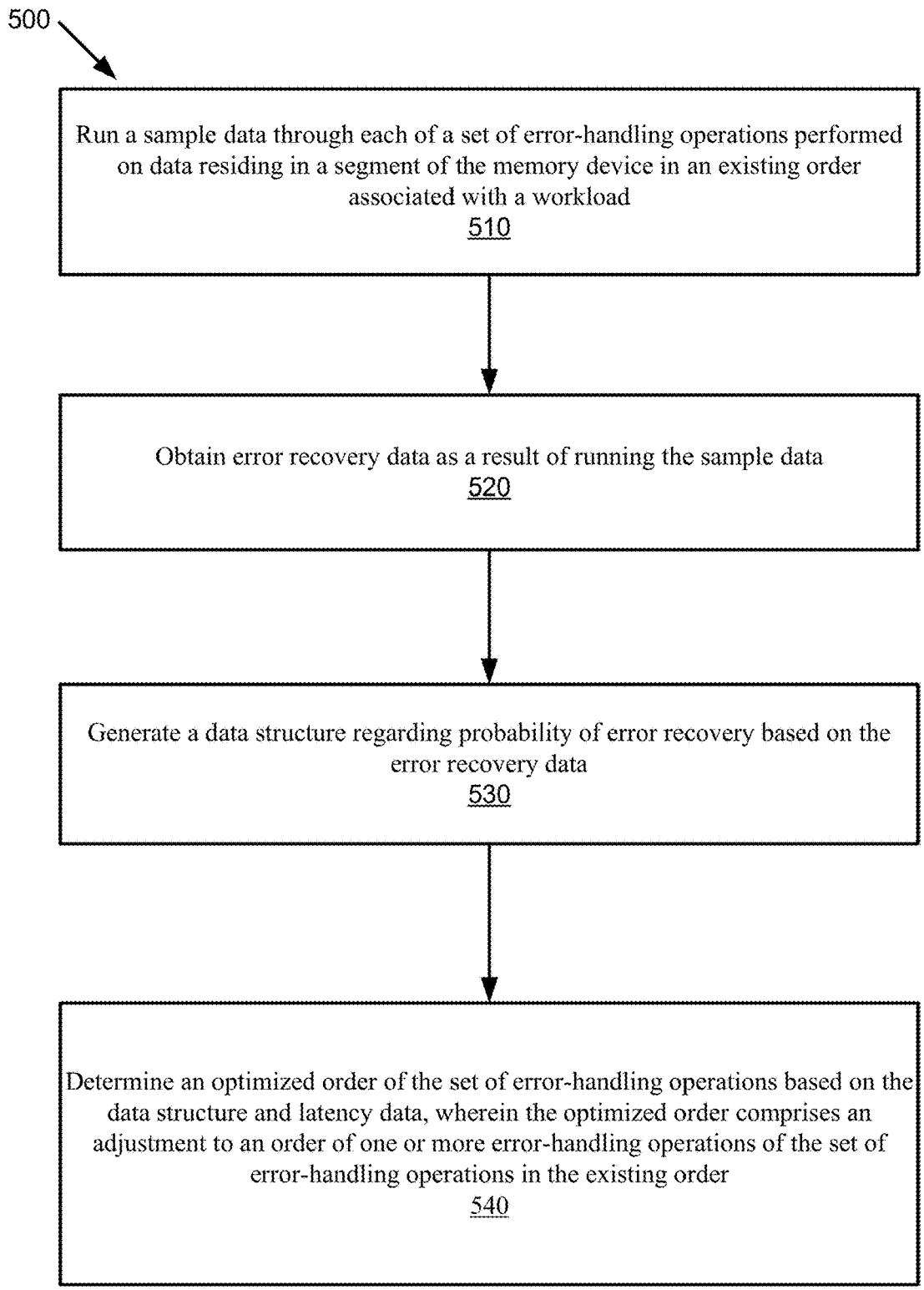
FIG. 5 is a flow diagram of an example method of performing error-handling flow optimization in accordance with some embodiments of the present disclosure.

FIG. 5 is a flow diagram of an example method 500 of error-handling flow optimization in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the error-handling flow optimization component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 510, the processing logic may run a sample data through each of a set of error-handling operations performed on data residing in a segment of the memory device in an existing order associated with a workload. In some implementations, the processing logic may select a sample data, which may be the same as or similar to the description with respect to FIG. 2.

At operation 520, the processing logic may obtain error recovery data (e.g., the error-handling data table 210) as a result of running the sample data.

At operation 530, the processing logic may generate a data structure (e.g., the error-handling probability tables 310A and 310B) regarding probability of error recovery based on the error recovery data.

In addition, the processing logic may obtain latency data for each of the error-handling operations. In some implementations, the latency data may include latency data for each of the error-handling operations regarding a workload specified to a user environment, and the latency data may be received from a user device that performs the workload.

At operation 540, the processing logic may determine an optimized order of the set of error-handling operations based on the data structure and latency data, wherein the optimized order comprises an adjustment to an order of one or more error-handling operations of the set of error-handling operations in the existing order. For example, the processing logic may update the error-handling flow data (e.g., metadata) by replacing previous error-handling operation rank with the current error-handling operation rank. As another example, the processing logic may update the error-handling flow data (e.g. table) by adding the reordered error-handling operation rank in addition to the original error-handling operation rank. As such, an error-handling flow has been optimized for each step associated with a segment of the memory device with respect to a workload, and the optimization is based on probability data collected offline or online.

In some implementations, operations 510-530 are performed offline as a pre-characterization using various workload conditions to generate probability data structure. Then, an optimized error-handling flow can be determined for each workload type and stored as information that is accessible by the memory device when it is put in use. Such implementations may be suitable for an average workload and an average memory device.

In some implementations, operations 510-530 are performed online as a background task of a memory device to generate probability data structure. Then, an optimized error-handling flow can be determined for each memory device (or a segment of the memory device). Such implementations may be suit for a specific memory device.

In some implementations, operations 510-530 are performed online when detecting a read error with respect to data residing in a segment of the memory device. The processing logic starts with a pre-determined error flow to generate probability data structure. Then, an optimized error-handling flow can be determined for the specific workload. Such implementations may be suit for a specific workload.

The processing logic may then send the optimized order, to the memory device, or a sub-system controller of the memory device, for performing the one or more error-handling operations of the set of error-handling operations in the optimized order on the data residing in the segment of the memory device.

Figure 6:
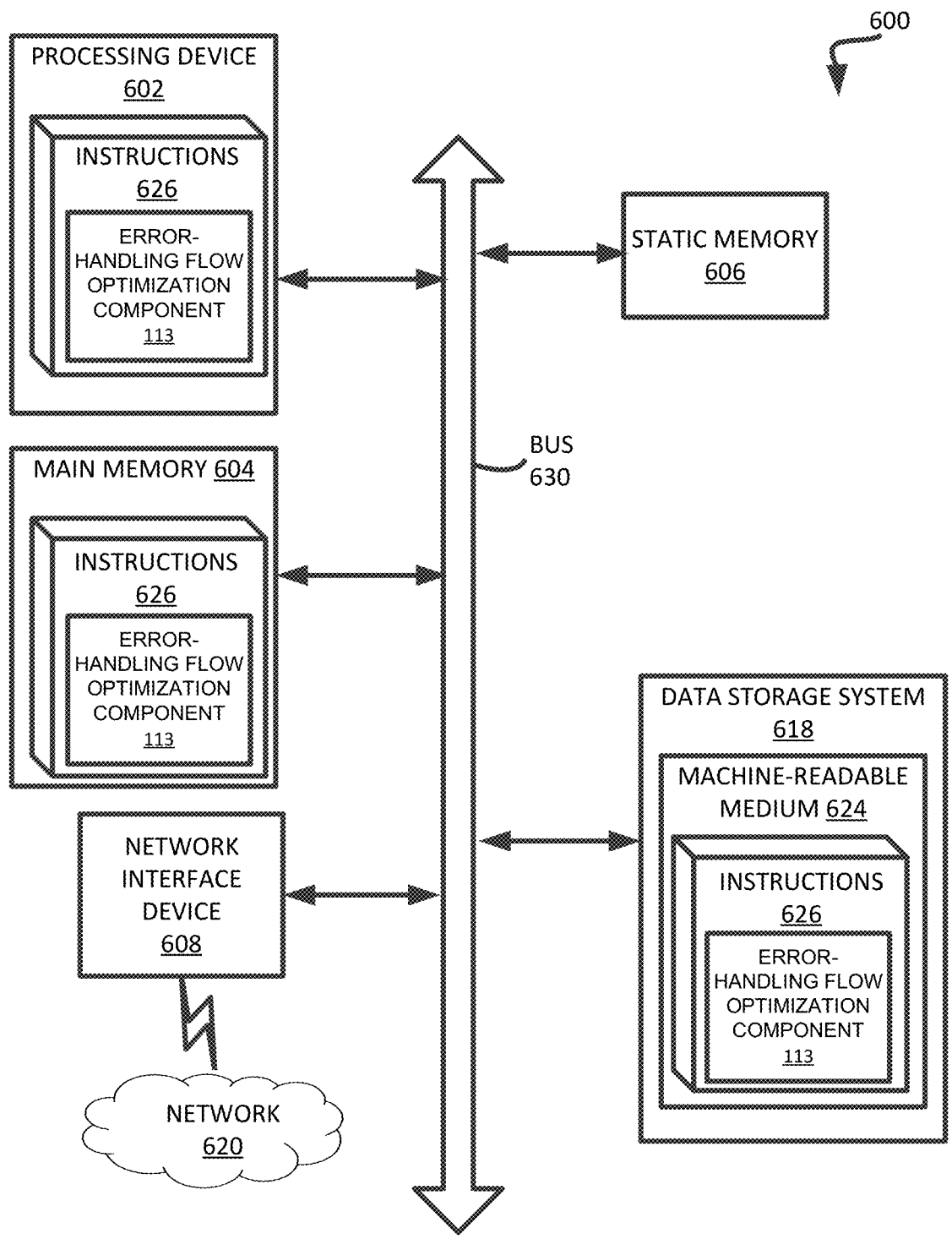
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes or utilizes a memory sub-system (e.g., the memory sub-system 110 of FIG. 1) or can be used to perform the operations of a controller (e.g., to execute an operating system to perform operations corresponding to error-handling flow management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630. Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to error-handling flow management component 113 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processing device, operatively coupled to the memory device, to perform operations comprising:
   running sample data through each of a set of error-handling operations performed on data residing in a segment of the memory device in an existing order; and
   determining an optimized order of the set of error-handling operations based on probability data and latency data, wherein the probability data is associated with a result of running the sample data, and wherein the optimized order comprises an adjustment to an order of one or more error-handling operations of the set of error-handling operations in the existing order.

2. The system of claim 1, wherein the existing order is associated with a workload.

3. The system of claim 1, wherein the result of running the sample data comprises error recovery-success data and error recovery-failure data for each operation of the set of error-handling operations.

4. The system of claim 1, wherein the operations further comprise:
   generating a data structure regarding the probability data.

5. The system of claim 4, wherein the data structure comprises all options for a probability of one error-handling operation of the set of error-handling operations to perform successfully in view of all previously-performed error-handling operations with respect to the one error-handling operation.

6. The system of claim 4, wherein the data structure is generated through a machine learning method.

7. The system of claim 4, wherein the data structure is generated through a Markov process.

8. The system of claim 4, wherein the data structure is pre-characterized or dynamically updated.

9. The system of claim 1, wherein the operations further comprise:
   running a second sample data through each of the set of error-handling operations performed on data residing in the segment of the memory device in the existing order associated with a second workload,
   wherein the probability data is associated with a result of running the second sample data.

10. The system of claim 1, wherein the operations further comprise:
    running a second sample data through each of the set of error-handling operations performed on data residing in a second segment of the memory device in the existing order associated with a workload,
    wherein the probability data is associated with a result of running the second sample data.

11. The system of claim 1, wherein the sample data is randomly selected from a set of data that has been successfully recovered using the existing order.

12. The system of claim 1, wherein the operations further comprise:
    updating the existing order as the optimized order, wherein running the sample data is performed recursively responsive to updating the existing order.

13. A method, comprising:
    running, by a processing device, sample data through each of a set of error-handling operations performed on data residing in a segment of a memory device in an existing order; and
    determining an optimized order of the set of error-handling operations based on probability data and latency data, wherein the probability data is associated with a result of running the sample data, and wherein the optimized order comprises an adjustment to an order of one or more error-handling operations of the set of error-handling operations in the existing order.

14. The method of claim 13, wherein the existing order is associated with a workload.

15. The method of claim 13, wherein the result of running the sample data comprises error recovery-success data and error recovery-failure data for each operation of the set of error-handling operations.

16. The method of claim 13, further comprising:
    generating a data structure regarding the probability data.

17. A non-transitory computer-readable storage medium comprising instructions that, when executed by a processing device operatively coupled to a memory, performs operations comprising:
    running sample data through each of a set of error-handling operations performed on data residing in a segment of a memory device in an existing order; and
    determining an optimized order of the set of error-handling operations based on probability data and latency data, wherein the probability data is associated with a result of running the sample data, and wherein the optimized order comprises an adjustment to an order of one or more error-handling operations of the set of error-handling operations in the existing order.

18. The non-transitory computer-readable storage medium of claim 17, wherein the existing order is associated with a workload.

19. The non-transitory computer-readable storage medium of claim 17, wherein the result of running the sample data comprises error recovery-success data and error recovery-failure data for each operation of the set of error-handling operations.

20. The non-transitory computer-readable storage medium of claim 17, wherein the operations further comprise:
    generating a data structure regarding the probability data.

* * * * *